United States Patent [19]

Matzner et al.

[11] Patent Number: 4,870,153

[45] Date of Patent: Sep. 26, 1989

[54] NOVEL POLY(ARYL ETHER) POLYMERS

[75] Inventors: Markus Matzner, Edison; George T. Kwiatkowski, Greenbrook, both of N.J.; Lloyd M. Robeson, Macungie, Pa.

[73] Assignee: Amoco Corporation, Chicago, Ill.

[21] Appl. No.: 111,344

[22] Filed: Oct. 22, 1987

[51] Int. Cl.[4] .................... G08G 8/02; G08G 14/00
[52] U.S. Cl. .................................... 528/125; 528/126; 528/128
[58] Field of Search .................... 528/125, 126, 128

[56] References Cited

U.S. PATENT DOCUMENTS 4,639,504  1/1987  Cottis .................................... 528/125

Primary Examiner—John Kight
Assistant Examiner—M. L. Moore
Attorney, Agent, or Firm—Frederick S. Jerome; William H. Magidson; Ralph C. Medhurst

[57] ABSTRACT

Described herein are novel poly(aryl ether) polymers that contain naphthalene, terephenylene and/or anthracenylene units within their chains. Representative polymers are tough materials having excellent high temperature, oxidative and chemical resistance, and easy melt fabricability.

2 Claims, No Drawings

NOVEL POLY(ARYL ETHER) POLYMERS

FIELD OF THE INVENTION

This invention is directed to novel poly(aryl ethers) that contain naphthalene, terephenylene and/or anthracenylene units within their chains. Representative polymers are tough materials having excellent high temperature, oxidative and chemical resistance, and easy melt-fabricability. Members of this class of resins are crystalline and display a high degree of order in the molten state or in solution.

BACKGROUND OF THE INVENTION

Poly(aryl ethers) have been known for about two decades; they are tough linear polymers that possess a number of attractive features such as excellent high temperature resistance, good electrical properties, and very good hydrolytic stability. Two poly(aryl ethers) are commercially available. A poly(aryl ether sulfone) is available from Imperial Chemical Industries Limited. It has the formula (1)

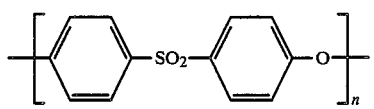
(1)

and is produced by polycondensation of 4,4'-dihydroxydiphenyl sulfone with 4,4'-dichlorodiphenyl sulfone as described in, for example, Canadian Pat. No. 847,963. The polymer contains no aliphatic moieties and has a heat deflection temperature of approximately 210° C. Another commercial poly(aryl ether) is available from Amoco Performance Products, Inc. under the trademark UDEL ®. It corresponds to formula (2) and has a heat deflection temperature of about 180° C.

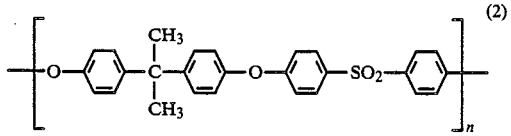
(2)

A closely related class of polymers, i.e., those wherein the sulfone group is partially or totally replaced by a keto group, is also known. The poly(aryl ether ketones) are engineering polymers that are highly crystalline [as opposed to the amorphous nature of (1) and (2)] with melting points above 300° C. Two of these crystalline poly(aryl ether ketones) are commercially available and are of the following structure:

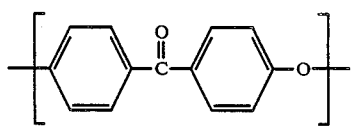
(3)

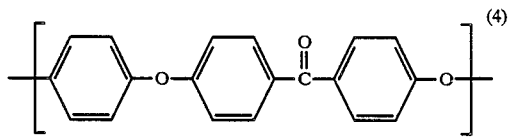
(4)

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophillic aromatic substitution (viz. Friedel-Crafts catalyzed) reaction of aromatic diacylhalides with unsubstituted aromatic compounds such as diphenyl ether. The evolution of this class to a much broader range of PAEs was achieved by Johnson et al., Journal of Polymer Science, A-1, Vol. 5, 1967, pp. 2415-2427; Johnson et al., U.S. Pat. Nos. 4,108,837 and 4,175,175. Johnson et al. show that a very broad range of PAEs can be formed by the nucleophillic aroatic substitution (condensation) reaction of an activated aromatic dihalide and an aromatic diol. By this method, Johnson et al. created a host of new PAEs including a broad class of poly(aryl ether ketones) (hereinafter called PAEK's).

In recent years, there has developed a growing interest in PAEK's as evidenced by Dahl, U.S. Pat. Nos. 3,953,400; Dahl et al., 3,956,240; Dahl, 4,247,682; Rose et al., 4,320,224; Maresca, 4,339,568; Attwood et al., Polymer, 1981, Vol 22, August, pp. 1096-1103; Blundell et al., Polymer, 1983, Vol 24, Aug. pp. 953-958; Att-Wood et al., Polymer Preprints, 20, No. 1, April 1979, pp. 191-194; and Rueda et al., Polymer Communications, 1983, Vol 24, September, pp. 258-260. In early to mid-1970, Raychem Corp. commercially introduced a PAEK called STILAN, a polymer whose acronym is PEK, each ether and keto group being separated by 1,4-phenylene units. In 1978, Imperial Chemical Industries PLC (ICI) commercialllized a PAEK under the trademark Victrex PEEK. As PAEK is the acronym of poly(aryl ether ketone), PEEK is the acronym of poly(ether ether ketone) in which the phenylene units in the structure are assumed.

Thus, both the poly(aryl ether sulfones) and the poly(aryl ether ketone) polymers are well known. They can be synthesized from a variety of starting materials; they show a wide range of glass transition (Tg) and melting (T$_m$) temperatures. They are tough materials and have a potential for a wide variety of uses; their favorable properties class them in the upper bracket of engineering polymers.

As mentioned before, two of the most widely used preparative poly(aryl ether sulfone) and poly(aryl ether ketone) methods are the nucleophilic polycondensation, involving activated dihalobenzenoid compounds and bisphenoxides; and the electrophilic (Friedel-Crafts) route, such as the reaction of diacyl halides with aromatic reaction of diacyl halides with aromatic hydrocarbons, catalyzed by a Lewis acid. Two additional routes were described in the literature. The first of these is the Ullman polymerization; thus, the self-condensation of sodium p-bromophenoxide to poly(1,4-phenylene oxide) is claimed in U.S. Pat. No. 3,220,910; a cuprous chloride/pyridine complex was used as the catalyst:

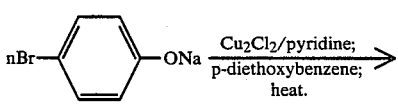
[I]

-continued

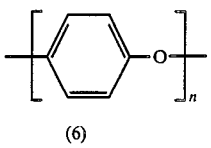

(6)

The reaction of equation was also investigated by vanDort et al., European Polymer Journal, Vol. 4, pp. 275–287 (1968); and by Jurek and McGrath, Am. Chem. Soc., Div. Polymer Chemistry, Preprints, Vol. 28, No. 1, pp. 180–182 (1987). Linear polyarylene polyethers composed of recurring units having the formula (—O—G—O—G'—)     (7)

and prepared via the Ullman route, are described in U.S. Pat. No. 3,332,909. In formula (7) G is the desiduum of a dihydric phenol selected from the group consisting of

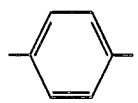

(8)

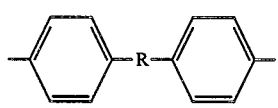

(9)

wherein R represents a bond between aromatic carbon atoms, —O—, —S—, —S—S, or a divalent hydrocarbon radical having from 1 to 18 carbon atoms inclusive; and G' is the residuum of a dibromo or diiodobenzenoid compound selected from the group consisting of

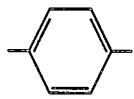

(8)

and

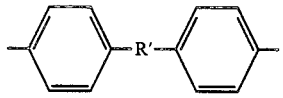

(10)

wherein R' represents a bond between aromatic carbon atoms, —O—, —S—, —S—S—, or a divalent hydrocarbon radical having from 1 to 18 carbon atoms inclusive; with the provisos that when R is —O—, R' is other than —O—; when G is (8), G' is (10); and when G' is (8), G is (9). The polyarylene polyethers were claimed to possess excellent physical properties and thermal, oxidative, and chemical stability.

Poly(aryl ethers) of a somewhat similar structure, were disclosed in European Patent Application No. 222,536. These latter polymers were also prepared via the Ullman polycondensation.

Poly(aryl ether) polymers were also prepared by the nickel catalyzed coupling of aryl polyhalides as described in U.S. Pat. No. 4,400,499. The coupling reaction is performed in the presence of a reducing metal selected from the group consisting of zinc, magnesium and manganese or mixtures thereof, and in a liquid phase of an aprotic solvent under substantially anhydrous conditions. The catalyst comprises a nickel compound and at least one ligand such as triarylphosphine; and an aromatic bidentate compound containing at least one ring nitrogen atom. High molecular weight poly(aryl ethers) were obtained via this route.

The Invention

The present invention is directed to novel poly(aryl ethers) containing naphthalene (11–13), terphenylene (14) and/or anthracenylene (15–18) units within their chains.

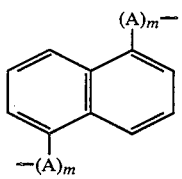

(11)

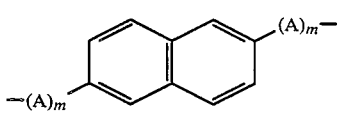

(12)

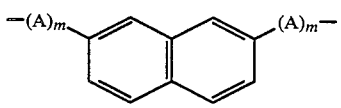

(13)

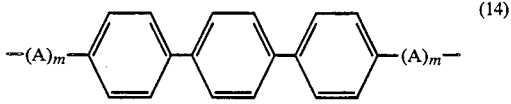

(14)

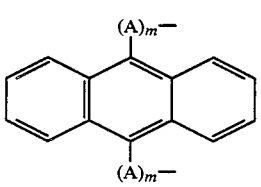

(15)

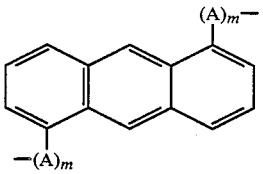

(16)

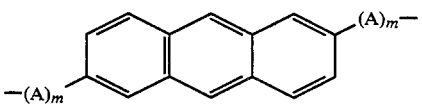

(17)

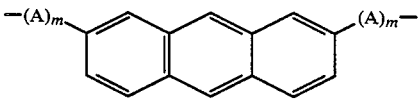

(18)

In the structures (11)–(18) A is the group

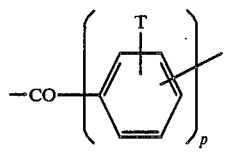

where the p's are integers and can be independently 1 or 2 and the m's are independently 0 or 1; T is as defined below.

The poly(aryl ethers) correspond to the general formula:

$$-E-O-E'-O- \qquad (19)$$

wherein E is selected from the group of (11)–(18), and wherein E' is of the formulae

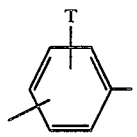

(20)

and/or

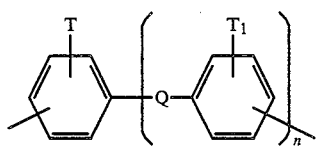

(21)

E' may also be the same as E; T and $T_1$ can be the same or different and can be independently hydrogen, $C_1$ to $C_4$ alkyl; $C_1$ to $C_4$ alkoxy; phenyl, α-styryl and α-methylstyryl; or halogen. Q represents a bond between aromatic carbon atoms, O, S, S—S, $CH_2$ or CO; with the proviso that when E is selected from the group of (11), (12) or (13) Q cannot be —CO— when both m's are zero and n is one; n is an integer of 1 to 5; when n>1 the Q groups may be the same or different.

It should be noted that the poly(aryl ether ketones) obtained from the difluorobenzoyl derivative (22) and the diphenol (23) were described recently

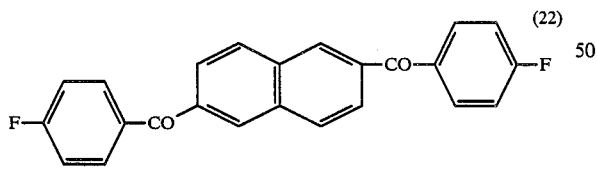

(22)

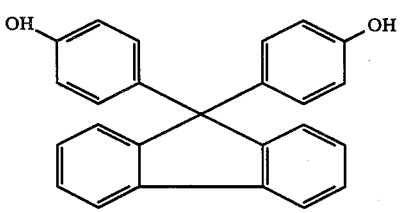

(23)

see B. J. Jensen, P. M. Hergenrother and S. J. Havens, talk presented at the "Symposium of Recent advances in Polyimides and Other High Performance Polymers", Reno, Nevada, July 13–16, 1987.

Naphthalene-base poly(aryl ethers) are also disclosed in Japanese Patent Applications Nos. 60/54,240, 60/116,475 and 62/39,632.

Representative poly(aryl ethers) of the present invention have excellent mechanical properties and very good thermal, oxidative and chemical resistance. Members of this class are highly crystalline; unexpectedly, many display a high degree of order in the molten state, or in solution, i.e., liquid crystalline (thermotropic) or lyotropic behavior.

The materials of the instant invention are preferably prepared via the Ullman route. The reaction involves the cuprous catalyzed condensation of a diphenol dialkali metal salt with an aromatic dihalide, as illustrated in equation [II]:

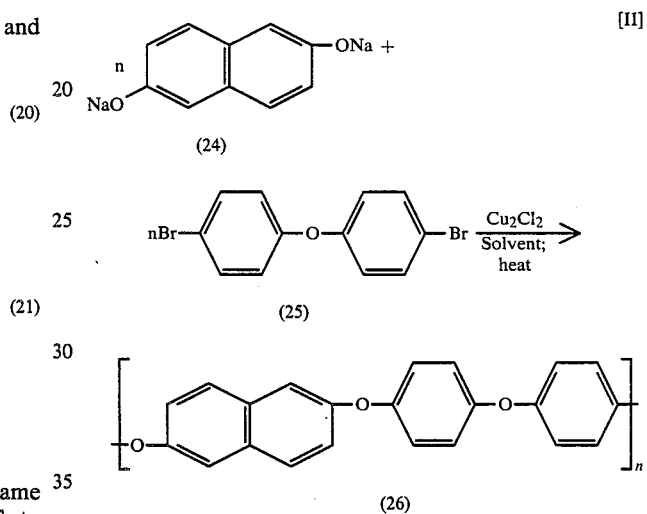

The polyethers represented by formula (19) can, therefore, be prepared via the condensation of
(a) the dihalide X—E—X, wherein X is halogen, with the dialkali metal salt of the diol HO—E'—OH; or via the condensation of
(b) the dihalide X—E'—X with the dialkali metal salt of the diol HO—E—OH.

Obviously, a variety of other combinations of reactants, obvious to those skilled in the art, are possible. Thus, one may use the halophenols (25) which will lead to poly(aryl ethers)

$$X-E-OH \qquad (27)$$

wherein E and E' are the same. It is also contemplated in this invention to use a mixture of two or more different dihydric phenols and/or two or more different aromatic dihalides to accomplish the same ends as above. Thus, when referred to above, the E (and E') residuum in the polymer structure can actually be the same or different aromatic residua.

While not wishing to be bound by any scientific theory or explanation of the polymerization, it is believed, as indicated in a study (H. Weingarten, J. Org. Chem., Vol. 29, p. 977 (1964); ibid., Vol. 29, p. 3624 (1964)) on the mechanism of the Ullman reaction, that Cu+ is the active catalytic species; it is assumed that it coordinates with the π system of the aromatic halide, thus facilitating carbonhalogen cleavage. With the Ullman reaction, the order of ease of halide replacement is I>Br>Cl>>F. This is actually the reverse of the order observed for polyether formation in typical nucleophilic polymerizations. Hence, the diiodoand the dibromo-monomers are the preferred dihaloaromatic materials.

The thermoplastic polyarylene polyethers described herein can be prepared in a substantially equimolar reaction of a double alkali metal salt of the dihydric phenol with a diiodo- or a dibromobenzenoid compound in the presence of a cuprous salt or cuprous salt complex as a catalyst. Any alkali metal salt of the dihydric phenol can be used as the one reactant. For purposes of this invention, to obtain high molecular weight polymers, it is preferred to conduct the reaction under substantially anhydrous conditions and in an oxygen free atmosphere.

Generally the reaction is carried out in an inert diluent in which the alkali metal salt of the dihydric phenol and/or the dibromo or diodobeneenoid compound is partly soluble. Suitable solvents include benzophenone, diphenyl ether, benzonitrile, dialkoxy benzenes in which each alkoxy group contains from 1 to 4 carbon atoms, trialkoxy benzenes in which each alkoxy group contains 1 to 4 carbon atoms, and the typical aprotic solvents such as diphenyl sulfoxide, dimethylsulfoxide, dimethylsulfone, diethylsulfoxide, diethylsulfone, diisopropylsulfone, tetrahydrothiophene-1,1-dioxide (commonly called tetramethylene sulfone or sulfolane), tetrahydrothiophene-1 monoxide, N,N-dimethylacetamide, N-methylpyrrolidone, N-cyclohexylpyrrolidone, and the like.

The double alkali metal salt of the dihydric phenol, if it is present as the hydrate, should be dehydrated separately or in the reaction mass to insure anhydrous conditions. Similarly, the alkali metal salt can be prepared in situ in the inert diluent by reacting the dihydric phenol with an alkali metal, alkali metal hydroxide, alkali metal hydride, alkali metal carbonate or bicarbonate or alkali metal alkyl compound, and thereafter removing water, by distilling off a water-containing azeotrope from the reaction mass or by like techniques, to obtain anhydrous conditions. Benzene, xylene, halogenated benzenes and other inert azeotrope forming organic liquids are suitable for this purpose.

The cuprous catalyst employed in the reaction can be a cuprous salt such as a cuprous halide, for example, cuprous chloride, cuprous bromide or cuprous iodide. Cuprous halides are preferred since they are highly effective but other cuprous salts can also be employed, for instance cuprous abietate (formed in situ by the reduction of cupric abietate), cuprous formate, cuprous acetate, and the like. The cuprous catalyst can also be a complex of any of the foregoing cuprous salts obtained by combining the cuprous salt with a complexing agent such as pyridine, dimethyl acetamide, quinoline, dimethylformamide, N-methylpyrrolidone, and the like. The quantity of the complexing agent can be varied widely but is usually in excess of the cuprous salt. The amount of the cuprous catalyst employed is at least 0.01 mole percent based on the total monomers present.

The reaction between the diiodo- or the dibromobenzenoid compound and the alkali metal salt of the dihydric phenol proceeds on an equimolar basis. This can be slightly varied, but as little a variation as 5 percent away from equal molar amounts, seriously reduces the molecular weight of the polymers.

Reaction temperatures above room temperature and generally above 100° C. are preferred. More preferred are temperatures between about 120° C. to about 360° C. Higher temperatures can, of course, be employed if desired, provided that care is taken to prevent degradation or decomposition of the reactants, the polymer and the solvents employed.

The polymer is recovered from the reaction mass in any convenient manner, such as by precipitation induced by cooling the reaction mass or by adding a nonsolvent for the polymer, or the solid polymer can be recovered by stripping off the solvent at reduced pressures and/or elevated temperatures.

Since the polymerization reaction results in the formation of the alkali metal bromide on each coupling reaction, it is preferred to either filter the salts from the polymer solution or to wash the polymer to substantially free it from these salts.

An alternative route to the poly(aryl ethers) of the present invention is the nickel coupling reaction of aromatic dihalides as described in U.S. Pat. No. 4,400,499 and in European Patent Application No. 25,460. The method is useful for the preparation of polymers wherein at least one of the Q groups in formula (21) is a chemical bond; the method is particularly useful when at least one of the Q group is a chemical bond and n in formula (21) is 2 or 4. Examples are shown in equations [III] and [IV] where Q, T and T₁ are as previously defined.

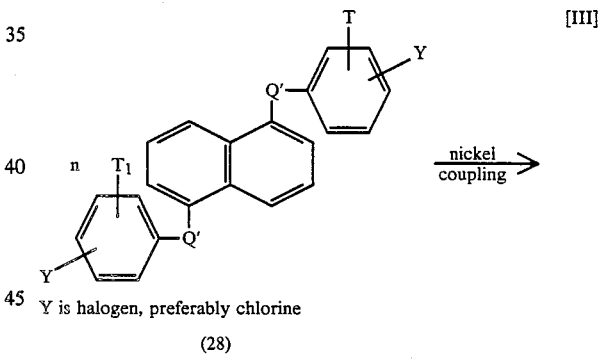

Y is halogen, preferably chlorine (28)

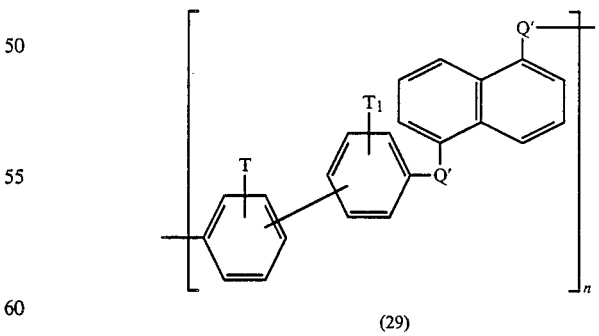

(29)

In the formulae above Q' may be —O— or —CO— and may be the same or different; at least one Q' must be an oxygen bridge.

A variety of para-haloghenoxy and/or para-halophenyl carbonyl derivatives of compounds (11)–(18) can be used in a similar fashion.

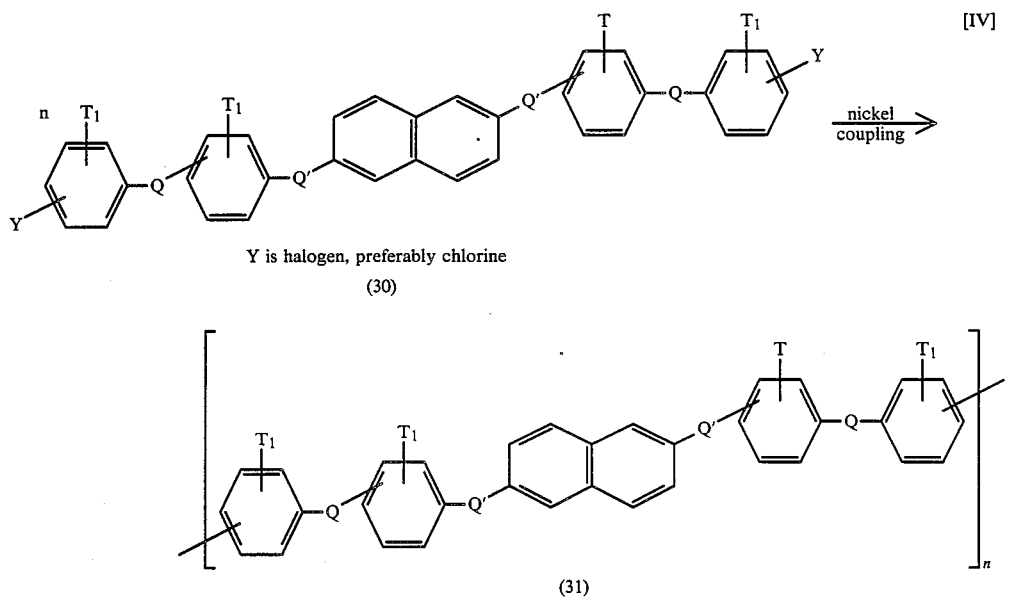

Y is halogen, preferably chlorine (30)

(31)

Derivatives similar to (30) and based on the compounds (11-18) can be used in an analogous manner. In formulae (30) and (31), Q and Q' are as defined above and may be the same or different; at least one Q or Q' group must be an oxygen bridge.

The polymerization reaction or coupling of the aryl dihalide, preferably dichloride, monomers proceeds by directly contacting the monomers with a catalyst mixture in the presence of a reducing metal selected from the group consisting of zinc, magnesium and manganese or mixtures thereof. The polymerization reaction is conducted in the presence of a liquid phase of an aprotic solvent under substantially anhydrous conditions for a time and at a temperature sufficient to form the substantially linear high molecular weight thermoplastic polymers.

The catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms. Suitable nickel compounds are nickel (O) complexes and those reducible by organometallic and metal reducing agents. These compounds include nickel halides, that is, the chlorides, bromides and iodides, nickel sulfates, nickel phosphates, nickel carbonates, nickel salts or organic acids having 1 to 18 carbons, such as, nickel formate, nickel acetate, and nickel organic complexes such as nickel acetylacetonate, dichloro-bis(triphenylphosphine)nickel (II) and the like; and nickel (O) compounds such as bis(1,5-cyclooctadiene)nickel, tetrakis(triphenylphosphine)-nickel, and the like. The anion of the nickel compounds is unimportant and merely serves to provide nickel ion to the catalyst mixture, but it must not interfere with the reaction of the nickel compound with the ligand. The preferred anions are the halides. Suitable triarylphosphines include triphenylphosphine, triphenylphosphines containing alkyl or alkoxy substituents having up to about 8 carbon atoms, and unsubstituted or alkyl- and alkoxy-substituted trinaphthyl phosphines. Suitable bidentate compounds include 2,2'-bipyridine, 1,10-phenanthroline, 1,8-diazonaphthalene, 2-methylaminopyridine, and the like. The preferred catalyst mixture comprises nickel chloride, triphenylphosphine and 2,2'-bipyridine.

The preferred ratio of gram atoms of nickel per mole of aryl polyhalide monomer is about 0.001 to about 0.1, with the most preferred range being 0.005 to 0.02. The ratio of triarylphosphine to nickel can range from 0 to about 100, preferably from about 10 to about 50 moles per gram atom of nickel. The ratio of bidentate ligand to nickel can range from 0 to about 5, preferably from about 0.2 to about 2, moles of bidentate ligand to gram atom of nickel. It is preferred to use a combination of triarylphosphine and aromatic bidentate ligand, wherein the ratio of triarylphosphine to nickel varies from about 10 to about 50, and the ratio of bidentate ligand to nickel varies from about 0.5 to about 2 moles per gram atom of nickel.

The preferred reducing metal for use in the polymerization reaction of aryl polyhalide monomers is zinc metal although magnesium and manganese metals can also be used. It is preferred that the metal be in finely divided form with an average sieve size of 20 or finer when measured on the U.S. sieve scale. Although the stoichiometric amount of reducing metal required in this polymerization or coupling reaction is about 1 mole of reducing metal per mole of aryl polyhalide monomer i.e., dihalide, it is preferred to use a 50 percent excess or greater.

While not wishing to be bound by any scientific theory or explanation of the mechanism of the polymerization or coupling reaction of this invention, it is believed that the combination of nickel compound, ligand and reducing metal provides nickel in a zero valent state, a form which in an anhydrous aprotic medium enables the coupling of aryl polyhalide monomers to take place in excellent yields. The nickel (O) ligand complex believed to be the active catalyst can be formed in situ in the presence of an aryl polyhalide monomer solution, but the catalyst is preferably preformed in situ prior to the addition of the aryl polyhalide monomer solution. A method for the determination of zero valent nickel is described by C. A. Tolman, J. Am. Chem. Soc. Volume 92, 2956 (1970). The presence of the active catalyst is indicated by the characteristic brown to red-brown color.

The polymerization or coupling reaction can take place at temperatures of from about 0° C. to about 250° C., preferably from about 25° C. to abut 120° C., and most preferably from about 40° C. to about 100° C. Pressure is not critical and so superatomspheric or subatmospheric pressures can be used as well as atmospheric pressure. The reaction is preferably carried out in an inert atmosphere. Reaction times can vary from minutes to as long as several hours. Inorganic salt promoters may be used with the triarylphosphines as ligands to reduce reaction times and/or temperatures.

Preferred inorganic salt promoters include alkali, alkaline earth, zinc, magnesium, manganese, and aluminum halides, or mixtures thereof. Iodides, chlorides and bromides are particularly preferred. The amount of promoter when used can range from about 0.1 to about 1000 moles per gram atom of nickel with about 1 to about 100 moles of promoter being preferred. If desired, one can also employ alkali, alkaline earth, zinc, magnesium, manganese, and aluminum sulfates or phosphates or mixtures thereof as promoters.

The classical nucleophilic polycondensation reaction of activated dihalobenzenoid compounds with diphenoxides in an additional route whereby certain of the novel poly(aryl ethers) can be prepared. The method is applicable to keto-containing polymers, where one of the starting materials is either an activated dihalobenzenoid monomer, or a halophenol whose halogen atom is in position ortho- or para to the carbonyl function. Examples are shown in equations [V] and [VI].

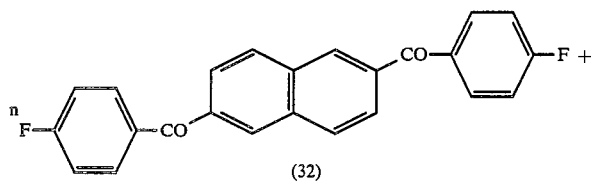
(32)

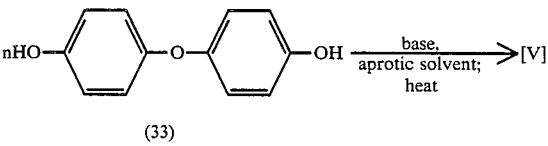
(33)

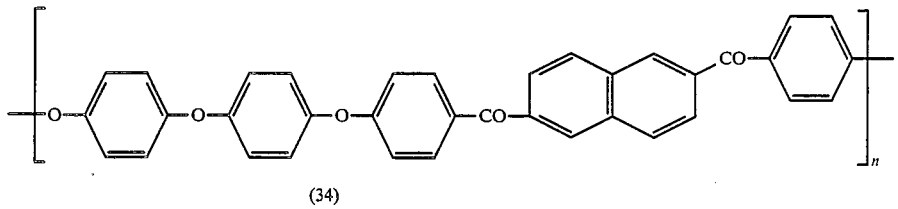
(34)

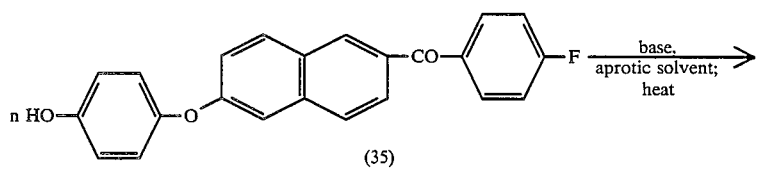
(35)

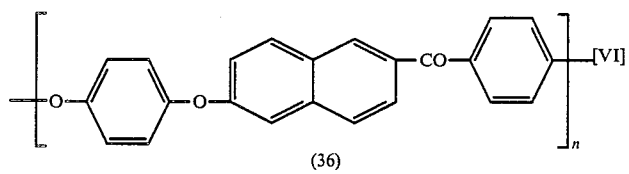
(36)

Thus, the poly(aryl ethers) may be produced by the process described in, for example, U.S. Pat. No. 4,176,222. This process comprises heating in the temperature range of 100° to 400° C., (i) at least one bisphenol and at least one dihalobenzenoid compound, and/or (ii) at least one halophenol in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

The higher alkali metal carbonates or bicarbonates are thus selected from the group consisting of potassium, rubidium and cesium carbonates and bicarbonates.

Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C., the water should be removed, e.g., by heating under reduced pressure, prior to reaching the polymerization temperatures.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, there should be at least 1 mole of carbonate, or 2 moles of bicarbonate, per mole of aromatic diol.

An excess of carbonate or bicarbonate may be employed. Hence, there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above, the amount of the second (higher) alkali metal carbonate or bicarbonate employed is such that there are 0.001 to about 0.2 gram atoms of the alkali metal of higher atomic number per gram atom of sodium.

Thus, when using a mixture of carbonates, e.g., sodium carbonate and cesium carbonate, there should be 0.1 to about 20 moles of cesium carbonate per 100 moles of sodium carbonate. Likewise, when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of the mixed carbonate to be employed.

Preferably, from 0.005 to 0.1 gram atoms of the alkali metal of the second alkali metal carbonate or bicarbonate per gram atom of sodium is used.

The reaction can be carried out in the presence or absence of an inert solvent.

Preferably, the solvent employed is an aliphatic or aromatic sulfoxide or sulfone of the formula

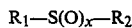

$$R_1-S(O)_x-R_2$$

where x is 1 or 2 and $R_1$ and $R_2$ are alkyl or aryl groups and may be the same or different. $R_1$ and $R_2$ may together form a divalent radical. Preferred solvents include dimethyl sulfoxide, dimethyl sulfone, sulfolane (1,1 dioxothiolan), or aromatic sulfones of the formula:

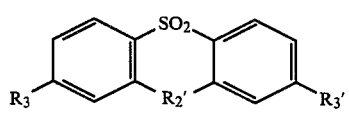

where $R'_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Ketone solvents such as benzophenone, are also useful.

The polymerization temperature is in the range of from about 100° C. to about 400° C. and will depend on the nature of the reactants and the solvent, if any, employed. The preferred temperature is above 270° C. The reactions are generally performed under atmospheric pressure. However, higher or lower pressures may be used.

For the production of some polymers, it may be desirable to commence polymerization at one temperature, e.g., between 200° C. and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The nucleophilic polymerizations may also be performed in the presence of a base comprising sodium carbonate and/or bicarbonate and an alkali metal halide selected from potassium, rubidium or cesium fluoride or chloride, or combinations thereof, as described in U.S. Pat. No. 4,638,044.

Other base systems, useful in the nucleophilic polycondensation reactions, are (1) a mixture of
  (a) a lithium and/or an alkaline earth metal carbonate or bicarbonate, and
  (b) a sodium, potassium, rubidium, and/or a cesium carbonate or bicarbonate, as described in German Patent Application No. 3,342,433;

(2) a mixture of sodium or an alkaline earth metal carbonate or bicarbonate and a potassium, rubidium or cesium salt of an organic acid, as described in U.S. patent application, Ser. No. 037,839, filed Apr. 13, 1987 in the names of Paul A. Winslow, Donald R. Kelsey and Markus Matzner, titled "Improved Process for Preparing Poly(aryl ethers) and Poly(aryl ether ketones)", commonly assigned; and (3) a mixture of sodium or an alkaline earth metal carbonate or bicarbonate and a lithium, sodium or alkaline earth metal salt of an organic acid, optionally in combination with a catalytic amount of a potassium, cesium or rubidium salt catalyst, as described in the aforementioned U.S. patent application, Ser. No. 037,839.

All of the above reactions may be advantageously performed in the presence of small amounts of cupric or cuprous ions.

The poly(aryl ethers) of the instant invention can also be prepared via the known electrophilic processes. Examples are shown in equations (VII) and (VIII).

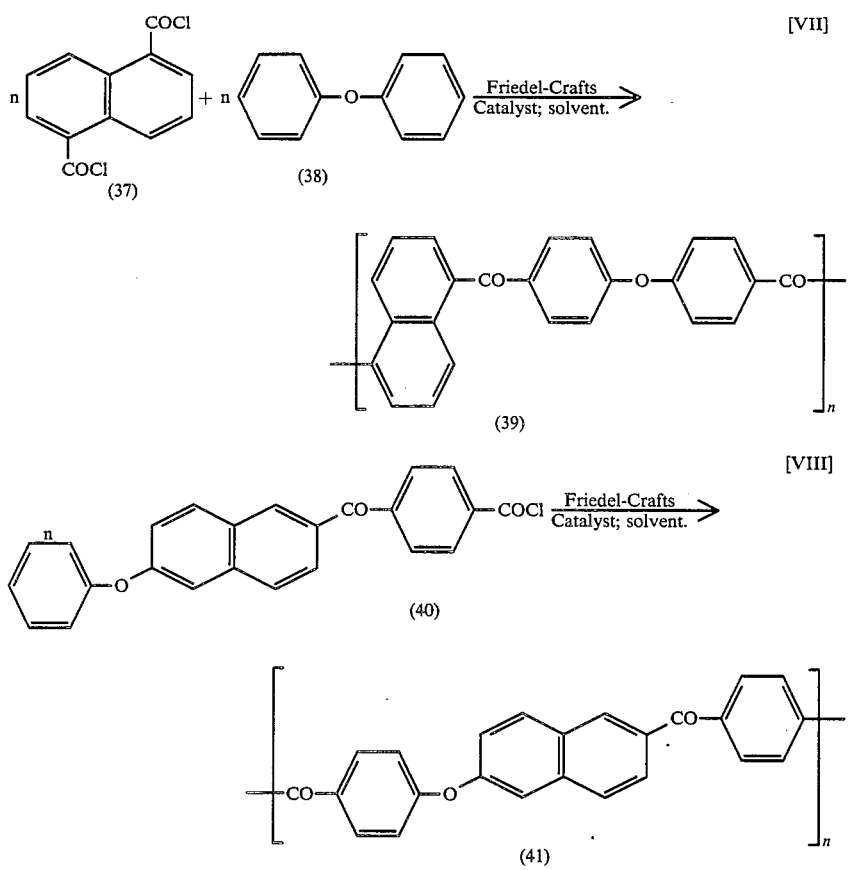

The poly(aryl ethers) may be produced by Friedel-Crafts reactions utilizing hydrogen fluoride-boron trifluoride catalysts as described, for example, in U.S. Pat. Nos. 3,953,400; 3,441,538; 3,442,857 and 3,516,966.

The poly(aryl ethers) may also be prepared according to the process as described in, for example, U.S. Defensive Publication No. T103,703 and U.S. Pat. No. 4,396,755. In such processes, reactants such as (a) an aromatic monocarboxylic acid;

(b) a mixture of at least one aromatic dicarboxylic acid and an aromatic hydrocarbon; and (c) combinations of (a) and (b) are reacted in the presence of a fluoroalkane sulphonic acid, particularly trifluoromethane sulphonic acid.

In another embodiment, the preparation may be conducted according to the process as described in U.S. Pat. No. 4,398,020. In such a process, (a) a mixture of substantially equimolar amounts of (i) at least one aromatic diacyl halide of formula YOC—Ar$_1$—COY where —Ar$_1$— is a divalent aromatic radical, such as naphthylene, terphenylene, anthracenylene, and the like; Y is halogen, preferably chlorine; and COY is an aromatically bound acyl halide group, which diacyl halide is polymerizable with at least one aromatic compound of (a) (ii), and (ii) at least one aromatic compound of the formula H—Ar'—H wherein H—Ar'—H is an aromatic compound such as biphenyl, terphenyl, naphthalene, anthracene, or diphenyl ether, and H is an aromatically bound hydrogen atom, which compound is polymerizable with at least one diacyl halide of (a) (i),
or (b) at least one aromatic monoacyl halide of the formula H—Ar"—COY where H—Ar"—H is an aromatic compound such as biphenyl, terphenyl, naphthalene, anthracene, diphenoxybiphenyl, diphenyl ether, diphenoxynaphthalene, diphenoxy-anthracene, and diphenoxybenzene, and H is an aromatically bound hydrogen atom, Y is halogen, preferably chlorine, and COY is an aromatically bound acyl halide group, which monoacyl halide is self-polymerizable, or (c) a combination of (a) and (b) is reacted in the presence of a fluoroalkane sulphonic acid.

Additionally, the polymers may be prepared by Friedel-Crafts processes as described in, for example, U.S. Pat. Nos. 3,065,205; 3,419,462; 3,441,538; 3,442,857; 3,516,966 and 3,666,612. In these patents, a poly(aryl ether) is produced by Friedel-Crafts polymerization techniques using Friedel-Crafts catalysts such as aluminum trichloride, zinc chloride, ferric bromide, antimony pentachloride, titanium tetrachloride, etc. and a solvent.

The polymers may be prepared by reacting diphenyl ether, biphenyl, terphenyl, naphthalene, or anthracene, and, optionally, in addition to the above, any of the well-known aromatic co-reactants such as diphenyl sulfide, 4,4'-diphenoxybiphenyl,
diphenyl methane, 1,4-diphenoxybenzene,
1,3-diphenoxybenzene, 1-phenoxynaphthalene,
4,4'-diphenoxybenzophenone,
4,4'-diphenoxy dibenzoyl benzene,
1,5-diphenoxynaphthalene,
1-phenoxyanthracene, 1,5-diphenoxyanthracene,
1,6-diphenoxyanthracene, and the like.

Similarly, the following compounds are diacyl halides which may be used as reactants:
terephthaloyl chloride, isophthaloyl chloride,
thio-bis(4,4'-benzoyl chloride),
benzophenone-4,4'-di(carbonyl chloride),
oxy-bis(3,3'-benzoyl chloride),
diphenyl-3,3'-di(carbonyl chloride),
benzophenone-3,3'-di(carbonyl chloride),
thio-bis(3,4'-benzoyl chloride),
diphenyl-3,4'-di(carbonyl chloride),
naphthalene-1,6-di(carbonyl chloride),
naphthalene-1,5-di(carbonyl chloride),
naphthalene-2,6-di(carbonyl chloride),
naphthalene-2,7-di(carbonyl chloride),
oxy-bis[7,7'-naphthalene-2,2'-di(carbonyl chloride)],
thio-bis[5,5'-naphthalene-1,1'-di(carbonyl chloride)],
7,7'-binaphthyl-2,2'-di(carbonyl chloride),
diphenyl-4,4'-di(carbonyl chloride),
carbonyl-bis[7,7'-naphthalene-2,2'-di(carbonyl chloride)],
sulfonyl-bis[6,6'-naphthalene-2,2'-di(carbonyl chloride)],
anthracene-1,5-di(carbonyl chloride) and the like.

Illustrative of suitable acyldihalides include carbonyl chloride (phosgene), carbonyl bromide, carbonyl fluoride and oxaloyl chloride.

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide, titanium tetrachloride, and stannic chloride, can also be used. In the preferred embodiment, excess of up to 100 mole percent of the acid catalyst is used.

The polymerization is generally carried out in the presence of a solvent. The preferred organic solvent is 1,2-dichloroethane. Other solvents such as symmetrical tetrachloroethane, o-dichlorobenzene, hydrogen fluoride, methylene chloride, trichloromethane, trichloroethylene, or carbon disulfide may be employed. Co-solvents such as nitromethane, nitropropane, dimethyl formamide, sulfolane, etc. may be used. Concentrations as low as 3 to as high as 40 weight percent may be used.

The reactions may be carried out over a range of temperatures which are from about $-40°$ C. to about $160°$ C. In general, it is preferred to carry out the reactions at a temperature in the range of $-10°$ C. to about $30°$ C. In some cases it is advantageous to carry out the reactions at temperatures above $30°$ C. or below $-10°$ C. Most preferably, the reactions are carried out at temperatures below about $0°$ C. The reactions may be carried out at atmospheric pressure although higher or lower pressures may be used. Reaction times vary depending on the reactants, etc. Generally, reaction times of up to 6 hours and longer are preferred.

The poly(aryl ethers) of this invention exhibit reduced viscosities of from about 0.05 to about 5.0, and preferably, from about 0.1 to about 2.0 dl/g as measured in an appropriate solvent (1 g/100 ml) at $25°$ C.

The poly(aryl ethers) of this invention may include mineral fillers such as carbonates including chalk, calcite and dolomite; silicates including mica, talc, wollastonite, silicon dioxide; glass spheres, glass powders; aluminum, clay, quartz, and the like. Also, reinforcing fibers such as fiberglass, carbon fibers, and the like may be used. The polymers may be blended with a variety of other polymers and may also include additives such as titanium dioxide, thermal stabilizers, ultraviolet light stabilizers, plasticizers, and the like.

The poly(aryl ethers) of this invention may be fabricated into any desired shape, i.e., moldings, coatings, films, or fibers.

EXAMPLES

The following examples serve to give specific illustrations of the practice of this invention but they are not intended in any way to limit the scope of this invention.

Example 1

This example illustrates the preparation of a poly(aryl ether) using the Ullman reaction.

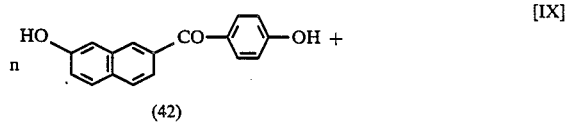
(42)

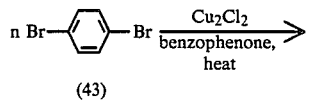
(43)

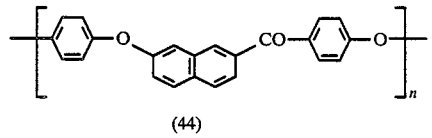
(44)

Into a flask are placed 0.1 moles of the anhydrous disodium salt of (42), 150 gms of benzophenone, and 0.1 moles of p-dibromobenzene (43). The flask is sparged with nitrogen, and 10 ml of a pyridine solution of cuprous chloride (about 1 mmole) are added. The reaction mass is heated for about 6 hours at $185°-215°$ C. after which 5 mole percent of bromobenzene (i.e., 0.005 moles) are added; heating is continued for an additional hour. The obtained polymer is thus essentially devoid of any undesirable phenoxide end-groups. The reaction mass is diluted with 200 ml of toluene, and the polymer product is precipitated by adding ethanol containing about 5 volume percent of acetic acid. The fluffy precipitate is washed with alcohol, hot water containing small amounts of acetic and hydrochloric acids, and again with hot alcohol-acetone. The product is then dried at about $80°$ C., under vacuum, until constant weight. Material (44) is obtained in an almost quantitative yield.

Example 2

This example illustrates the preparation of a poly(aryl ether) using the mucleophilic polycondensation method.

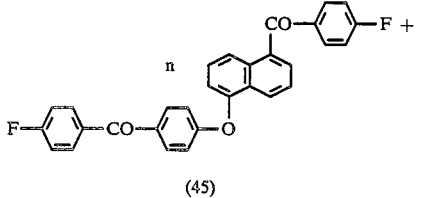

(45)

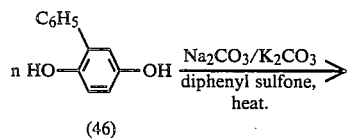

(46)

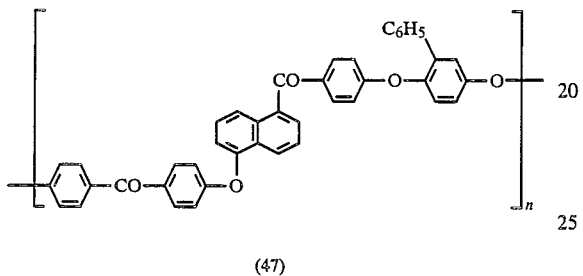

(47)

A mixture of 0.1 moles of the difluoride (45), 0.1 moles of phenylhydroquinone (46), 0.18 moles of sodium carbonate, 0.02 moles of potassium carbonate, 250 gms of diphenyl sulfone, and 100 ml of chlorobenzene is placed into a flask provided with a stirrer, thermometer, nitrogen inlet tube and a dean-stark trap, topped with a reflux condenser. The mixture is heated with stirring under a dry nitrogen atmosphere to about 130°–140° C., at which point distillation of chlorobenzene/water begins. The mixture is kept at about 150° C. for about one hour; during this time the chlorobenzene which has distilled out, is replaced by fresh chlorobenzene. The temperature is then gradually increased without further addition of fresh chlorobenzene to about 280° C. (2 hours) and kept at 280° C. for 2.5 hours. The reaction mixture is then heated to about 290° C. and kept at this temperature for 0.5 hours. After cooling, the contents of the flask are ground to a fine powder and extracted twice with acetone (each time: 1 liter of acetone, 1 hour of stirring), twice with 5 percent aqueous hydrochloric acid (700 ml of acid and 1 hour of stirring each time), followed by treatment with boiling water (1 liter of water, 1 hour of stirring) and then again with acetone (1 liter, 1 hour of stirring).

The polymer is then dried under vacuum at about 100° C. till constant weight. It is obtained in an essentially quantitative yield.

The tables that follow list additional polymers prepared by the methods discussed above.

Example 3

This example illustrates the preparation of a poly(aryl ether) using the electrophilic polycondensation method.

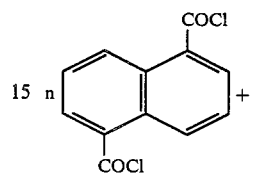

(37)

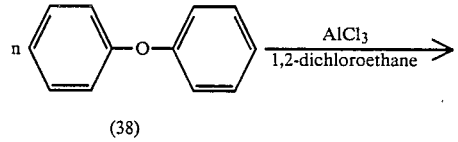

(38)

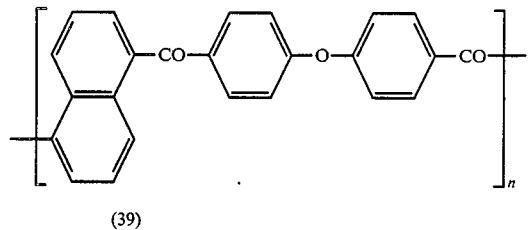

(39)

A three-liter glass lined reactor is charged with 0.50 moles of diphenyl ether (38), 0.50 moles of naphthalene-1,5-dicarbonyl chloride (37) and 1650 ml of 1,2-dichloroethane. The mixture is cooled to 0.5° C. and 1.55 moles of aluminum chloride are slowly added while maintaining the temperature between 0°–5° C. The resulting reaction mixture is held at 5°–10° C. for about 7 hours. At the end of this period the ice bath is removed, and the reaction mixture is allowed to warm to ambient temperature ( 25° C.) where it is held for an additional 16 hours. The reaction mixture is poured into 6 liters of ice water containing 200 ml of concentrated hydrochloric acid. The resulting multiphase system is heated to about 85° C. to distill the 1,2-dichloroethane. The polymer (39) is isolated by filtration, washed with water (2×1500 ml) and methanol (2×1500 ml), and dried in a vacuum oven at 100° C. It is obtained in an essentially quantitative yield.

TABLE I

Preparation of Poly(aryl ethers) Via the Ullman Reaction

| Example No. | | Starting Materials |
|---|---|---|
| 4. | 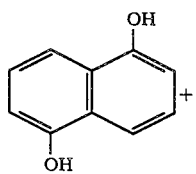 | 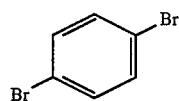 |

TABLE I-continued
Preparation of Poly(aryl ethers) Via the Ullman Reaction

| Example No. | | Starting Materials |
|---|---|---|
| 5. | 1,5-dihydroxynaphthalene + | 4,4'-dibromodiphenyl ether |
| 6. | 1,5-dihydroxynaphthalene + | 4,4'-dibromobiphenyl |
| 7. | 1,5-dihydroxynaphthalene + | 1,5-dibromonaphthalene |
| 8. | 1,5-dihydroxynaphthalene + | 2,6-dibromonaphthalene |
| 9. | 2,6-dihydroxynaphthalene + | 1,4-dibromobenzene |
| 10. | 2,6-dihydroxynaphthalene + | 4,4'-dibromodiphenyl ether |
| 11. | 2,6-dihydroxynaphthalene + | 4,4'-dibromobiphenyl |
| 12. | 2,6-dihydroxynaphthalene + | 1,5-dibromonaphthalene |
| 13. | 2,6-dihydroxynaphthalene + | 2,6-dibromonaphthalene |
| 14. | 2,7-dihydroxynaphthalene + | 1,4-dibromobenzene |

TABLE I-continued
Preparation of Poly(aryl ethers) Via the Ullman Reaction

| Example No. | | Starting Materials |
|---|---|---|
| 15. | HO—[naphthalene-2,7-diyl]—OH + | Br—[C6H4]—O—[C6H4]—Br |
| 16. | HO—[naphthalene-2,7-diyl]—OH + | Br—[C6H4]—[C6H4]—Br |
| 17. | HO—[naphthalene-2,7-diyl]—OH + | 1,5-dibromonaphthalene |
| 18. | HO—[naphthalene-2,7-diyl]—OH + | 2,6-dibromonaphthalene |
| 19. | hydroquinone + | 1,5-dibromonaphthalene |
| 20. | hydroquinone + | 2,6-dibromonaphthalene |
| 21. | HO—[C6H4]—O—[C6H4]—OH + | 1,5-dibromonaphthalene |
| 22. | HO—[C6H4]—O—[C6H4]—OH + | 2,6-dibromonaphthalene |
| 23. | HO—[C6H4]—[C6H4]—OH + | 1,5-dibromonaphthalene |
| 24. | HO—[C6H4]—[C6H4]—OH + | 2,6-dibromonaphthalene |

TABLE I-continued
Preparation of Poly(aryl ethers) Via the Ullman Reaction

| Example No. | Starting Materials |
|---|---|
| 25. | HO—⟨C6H4⟩—OH  +  Br—⟨anthracene-2,6-diyl⟩—Br |
| 26. | HO—⟨C6H4⟩—CO—⟨C6H4⟩—⟨C6H4⟩—⟨C6H4⟩—OH  +  Br—⟨C6H4⟩—⟨C6H4⟩—Br |

TABLE II
Preparation of Poly(aryl ethers) Via the Nickel Coupling Reaction

| Example No. | Reagents |
|---|---|
| 27. | Cl—⟨C6H4⟩—O—⟨C6H4⟩—CO—⟨naphthalene-2,6-diyl⟩—CO—⟨C6H4⟩—O—⟨C6H4⟩—Cl |
| 28. | Cl—⟨C6H4⟩—⟨naphthalene-2,6-diyl⟩—⟨C6H4⟩—Cl |
| 29. | Cl—⟨C6H4⟩—O—⟨anthracene-2,6-diyl⟩—O—⟨C6H4⟩—Cl |

TABLE III
Preparation of Poly(aryl ethers) Via the Nucleophilic Polymerization

| Example No. | Reagents |
|---|---|
| 30. | HO—⟨C6H4⟩—OH  +  F—⟨C6H4⟩—CO—⟨naphthalene-1,5-diyl⟩—CO—⟨C6H4⟩—F |
| 31. | HO—⟨C6H4⟩—O—⟨C6H4⟩—OH  +  F—⟨C6H4⟩—CO—⟨naphthalene-1,5-diyl⟩—CO—⟨C6H4⟩—F |

TABLE III-continued
Preparation of Poly(aryl ethers) Via the Nucleophilic Polymerization
| Example No. | Reagents |
|---|---|
| 32. | 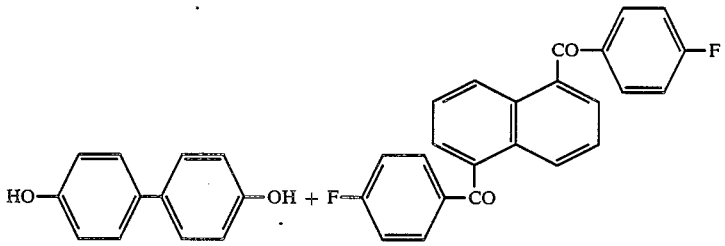 |
| 33. | 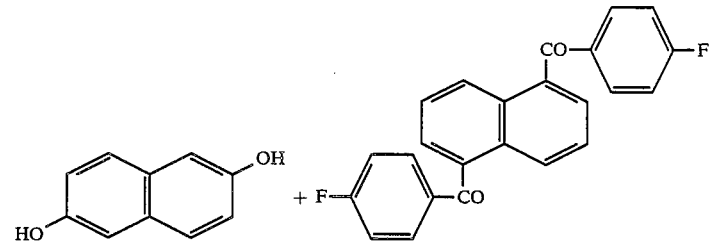 |
| 34. | 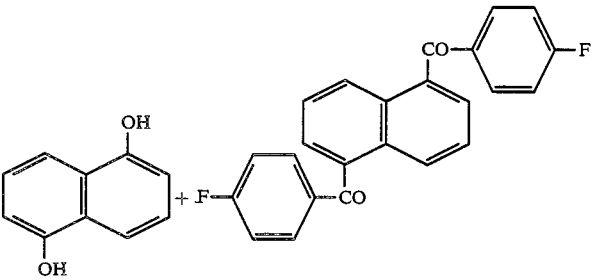 |
| 35. | 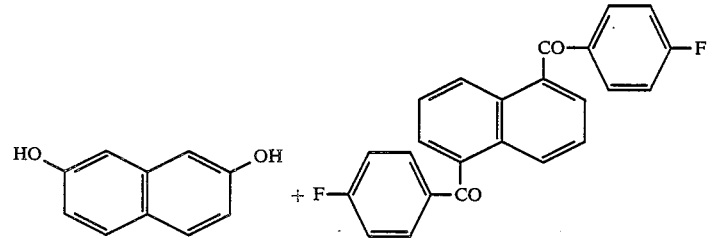 |
| 36. | 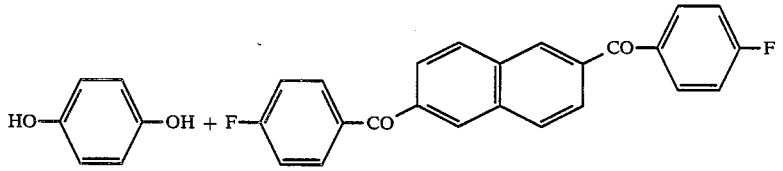 |
| 37. | 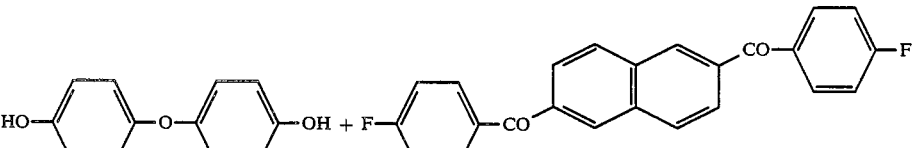 |

TABLE III-continued
Preparation of Poly(aryl ethers) Via the Nucleophilic Polymerization
| Example No. | Reagents |
|---|---|
| 38. | 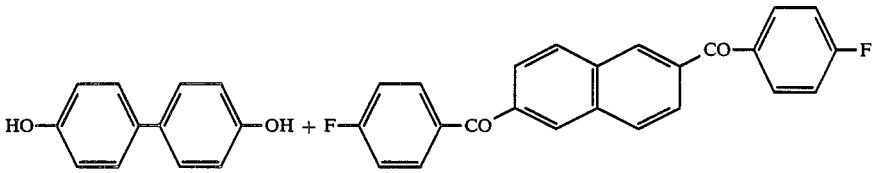 |
| 39. | 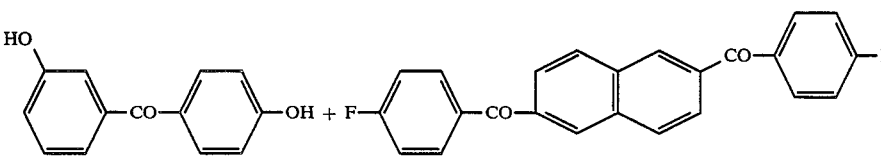 |
| 40. | 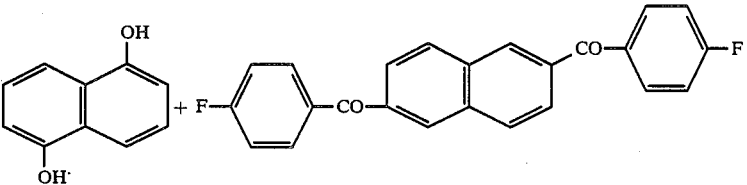 |
| 41. | 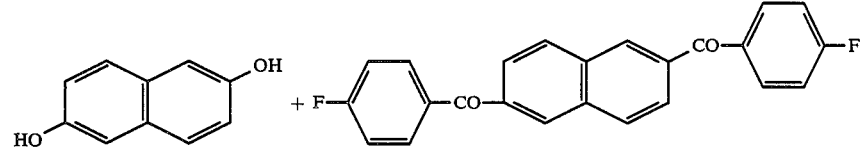 |
| 42. | 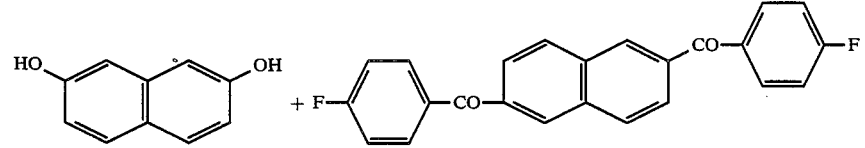 |
| 43. | 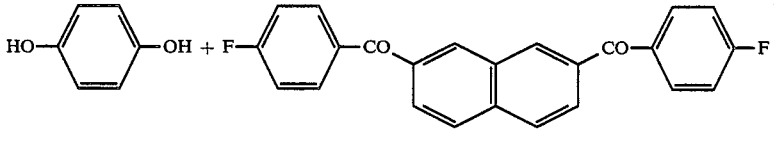 |
| 44. | 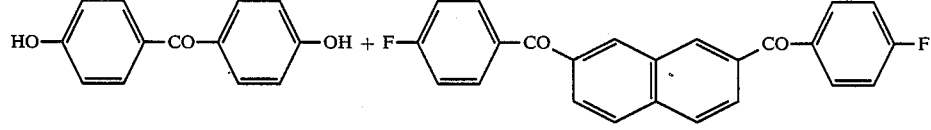 |
| 45. | 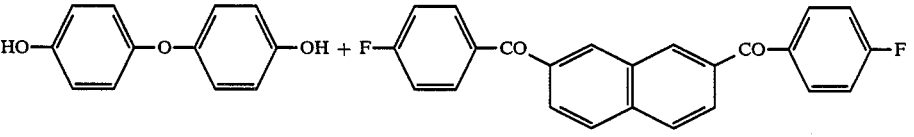 |
| 46. | 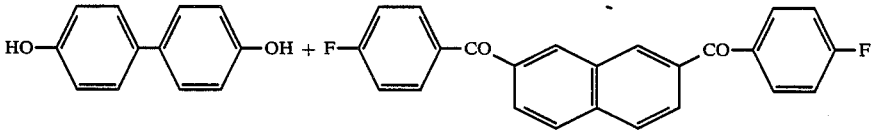 |

TABLE III-continued
Preparation of Poly(aryl ethers) Via the Nucleophilic Polymerization
| Example No. | Reagents |
|---|---|
| 47. | 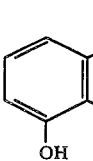 |
| 48. | 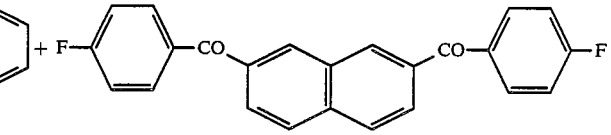 |
| 49. | 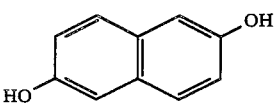 |
| 50. | 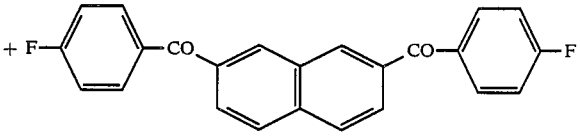 |
TABLE IV
Preparation of Poly(aryl ethers) Via the Electrophilic Route
| Example No. | Reagents |
|---|---|
| 51. | 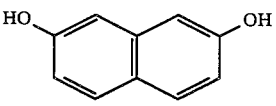 |
| 52. | 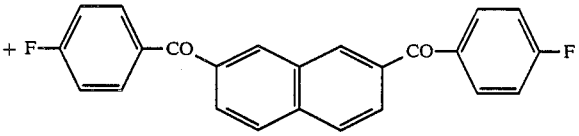 |
| 53. | 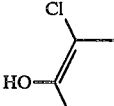 |
| 54. | 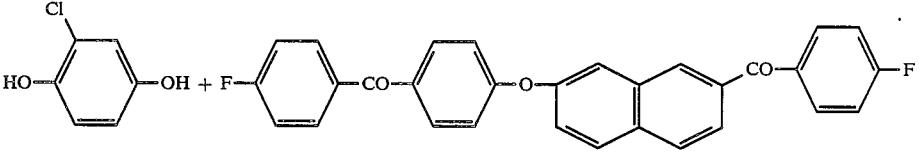 |
| 55. | 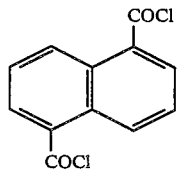 |

TABLE IV-continued

Preparation of Poly(aryl ethers)
Via the Electrophilic Route

| Example No. | Reagents |
|---|---|
| 56. | 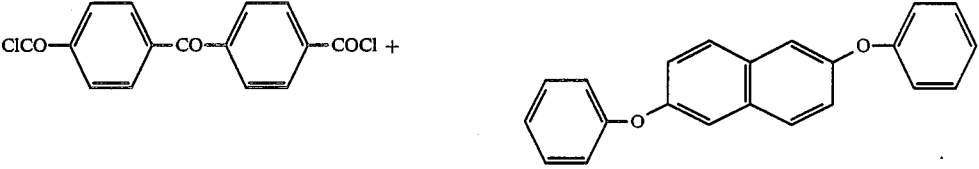 |

What is claimed is:

1. Poly(aryl ethers) having repeating units of the formula

—E—O—E'—O— wherein E is one or more: divalent aromatic radical selected from the group consisting of

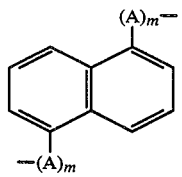

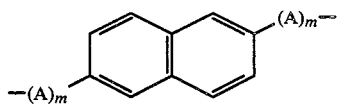

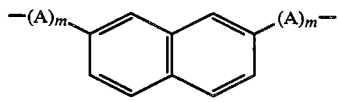

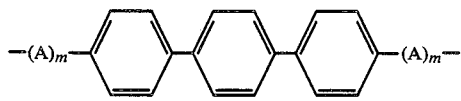

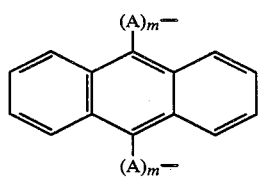

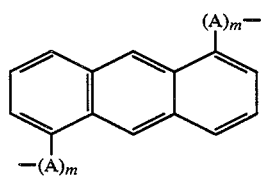

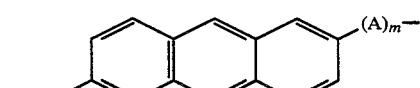

and

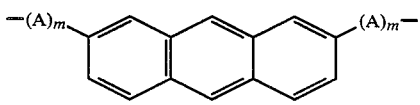

and E' is one or more divalent radical selected from the group consisting of: E,

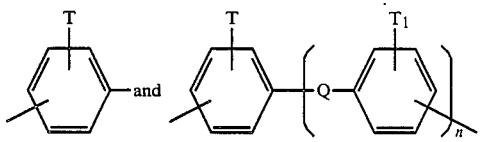

where A is the group

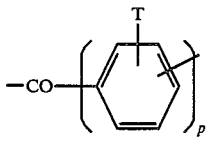

p is an integer and is independently 1 or 2; m is independently 0 or 1 with the proviso that when m is 1 the linkage of the group A to the body of the E radical is via the carbonyl function of the A group, and n is an integer of 1 to 5; T and $T_1$ can be the same or different and are independently hydrogen, $C_1$ to $C_4$ alkyl, $C_1$ to $C_4$ alkoxy, phenyl, α-styryl, α-methylstyryl or halogen; Q is independently a chemical bond, O, S, S—S, $CH_2$ or CO, with the proviso that when E is a naphthylene containing group and both m's are zero and n is one, Q cannot be CO.

2. Poly(aryl ethers) having repeating units of the formula

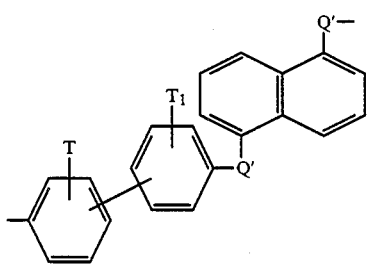

wherein T and $T_1$ are independently hydrogen, $C_1$ to $C_4$ alkyl, $C_1$ to $C_4$ alkoxy, phenyl, α-styryl, α-methylstyryl or halogen and Q' is independently O or CO with the proviso that at least one Q' is an oxygen bridge.

* * * * *